United States Patent

Burkhart et al.

Patent Number: 5,614,566
Date of Patent: Mar. 25, 1997

[54] METHOD FOR THE PREPARATION OF RIGID FOAMS HAVING URETHANE AND/OR ISOCYANURATE GROUPS AND BEING EXTENSIVELY OPEN CELLED

[75] Inventors: Georg Burkhart; Helmut Schator, both of Essen, Germany

[73] Assignee: Th. Goldschmidt AG., Essen, Germany

[21] Appl. No.: 489,175

[22] Filed: Jun. 8, 1995

Related U.S. Application Data

[63] Continuation-in-part of Ser. No. 188,176, Jan. 28, 1994, abandoned.

[30] Foreign Application Priority Data

Feb. 10, 1993 [DE] Germany .......................... 43 03 809.3

[51] Int. Cl.$^6$ ................................ C08L 75/04; C08K 5/01; C08J 9/00
[52] U.S. Cl. ............................ 521/132; 521/155; 521/161; 521/137
[58] Field of Search ..................... 521/132, 155, 521/161, 137

[56] References Cited

U.S. PATENT DOCUMENTS

| | | | |
|---|---|---|---|
| 4,737,524 | 4/1988 | Ako et al. | 521/101 |
| 4,742,112 | 5/1988 | Brauer et al. | 524/705 |
| 4,906,673 | 3/1990 | Mori et al. | 521/131 |
| 5,079,270 | 1/1992 | Burkhart et al. | 521/117 |
| 5,104,904 | 4/1992 | Glynn et al. | 521/99 |
| 5,130,344 | 7/1992 | Kollmeier et al. | 521/111 |
| 5,238,970 | 8/1993 | De Vos | 521/114 |
| 5,401,785 | 3/1995 | Kumagai et al. | 521/112 |

FOREIGN PATENT DOCUMENTS

| | | |
|---|---|---|
| 0173004 | 3/1986 | European Pat. Off. . |
| 3049834 | 2/1982 | Germany . |
| 3122790 | 12/1982 | Germany . |
| 3837351 | 11/1989 | Germany . |
| 3829104 | 3/1990 | Germany . |

*Primary Examiner*—Jeffrey C. Mullis
*Attorney, Agent, or Firm*—Anderson Kill & Olick P.C.

[57] ABSTRACT

A method is described for the preparation of rigid foams, having urethane and/or isocyanurate groups and being extensively open celled, by reacting polyisocyanates with compounds having at least two groups capable of reacting with isocyanates and the equivalent weight per reactive group of which is about 9 to 800, in the presence of catalysts, surface active substances, as well as, optionally, physical blowing agents, flame retardants and other known auxiliary materials and finishing agents, wherein the reaction is carried out in the presence of liquid, higher molecular weight, unsaturated hydrocarbons, which are free of groups capable of reacting with isocyanates, in amounts of 0.01 to 3.0% by weight, based on the reaction formulation. Particularly preferred hydrocarbons are polybutadiene and polyoctenylene with an average molecular weight of 800 to 10,000 g/mole. The rigid foams, because of their open cell nature, exhibit high dimensional stability.

7 Claims, No Drawings

METHOD FOR THE PREPARATION OF RIGID FOAMS HAVING URETHANE AND/OR ISOCYANURATE GROUPS AND BEING EXTENSIVELY OPEN CELLED

This is a continuation-in-part application of Ser. No. 08/188,176, filed Jan. 28, 1994, now abandoned.

FIELD OF INVENTION

The invention relates to a method for the preparation of rigid foams, having urethane, isocyanurate or both groups and being extensively open celled, by the reaction of polyisocyanates with compounds having at least two groups, which are capable of reacting with isocyanates and have the equivalent weight per reactive group of about 9 to 800, in the presence of catalysts, surface active substances as well as, optionally, physical blowing agents, flame retardants and other known auxiliary materials and finishing agents.

BACKGROUND INFORMATION AND PRIOR ART

According to the state of the art, rigid polyurethane foams are produced from polyols with, on the average, three hydroxyl groups per molecule, at least difunctional isocyanates, catalysts, blowing agents and polysiloxane-polyoxyalkylene block copolymers as foam stabilizers, as well as, optionally, conventional additives.

A summary of the raw materials, which may be used, and of the methods, which may be employed, can be found in Ullmann's "Enzyklopaedie der technischen Chemie" (Encyclopedia of Chemical Engineering), 1980, volume 19, pages 301 to 341, and "Kunststoffhandbuch" (Plastics Handbook), volume VII, Polyurethanes, by G. Oertel, Carl Hanser Verlag, Munich, 1983, pages 246 to 331.

In general, polyetherols or polyesterols with, on the average, at least three hydroxyl groups per molecule are used, the OH number of the polyols generally being between 100 and 800.

As blowing agents, halogenated hydrocarbons with boiling points below 50° C. or water, as well as combinations of the two are preferably used. The water reacts with isocyanate, and in the process carbon dioxide is split off and polyurea is formed. The molded objects formed generally are closed celled. The density of the rigid foams lies between 5 and 1,000 $kg/m^3$, preferably between 10 and 400 $kg/m^3$ and especially between 20 and 60 $kg/m^3$.

If rigid foams are produced with lower densities below about 23 $kg/m^3$, a shrinkage generally occurs, that is, the cell structure, in the case of closed cells, can no longer withstand the external air pressure. This shrinkage is supported by the diffusion of the carbon dioxide through the intact cell membrane toward the surface of the foamed object, since a reduced pressure develops in the cells as a result.

If a dimensionally stable, very light polyurethane foam is to be produced, it is necessary, by suitable measures, to produce a foam with sufficient open cells. For this purpose, according to the state of the art, excess amount of water is used, for which no corresponding amount of isocyanate is available. Upon reaching the boiling point, the water evaporates and tears the cell membranes, unless the latter are stabilized excessively.

The so-called one-component foams are a special foam of rigid polyurethane foams. They are used especially for connecting or filling out workpieces, doors, door frames or hollow spaces in buildings or motor vehicles. For this purpose, the foam components are usually sprayed from a pressure container, such as an aerosol can, into the hollow spaces that are to be filled out, the reaction mixture being inflated by the expanding propellant gas. The resulting foam solidifies due to the reaction between the isocyanate groups and the moisture of the air into a dimensionally stable foam.

Such one-component polyurethane foam systems are described in the patent literature. Reference is made to the German patent 30 49 834 and to the German Offenlegungsschrift 38 29 104 as being representative of such literature.

An important condition for the industrial utilizability of the one-component foams obtained is the requirement of dimensional stability. The foam must not change its original shape when acted upon by the humidity of the air, by temperature, or by a change in air pressure. Since water vapor and carbon dioxide easily diffuse through the cell walls of the foam, the foam contracts when the surrounding atmosphere has a lower water vapor and/or carbon dioxide content than the cell spaces. Conversely, due to increased absorption of water vapor and/or lower carbon dioxide from the surrounding atmosphere, the foam can expand. In the same way, the foam can react to differences in atmospheric pressure.

There has been no lack of attempts to improve the dimensional stability of rigid polyurethane foams in general and of one-component foams in particular. This improvement is accomplished by opening, at least partially, the cells of the rigid polyurethane foam that is being formed.

The preparation of dimensionally stable rigid polyurethane foams is an object of the German patent 39 28 867. The objective is accomplished by the use of polysiloxane-polyoxyalkylene block copolymers, which have at least one aminofunctional group of the general formula

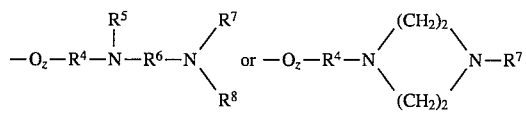

linked to a silicon atom, wherein $R^4$ is a divalent group, $R^5$ is a hydrogen or alkyl group with 1 to 4 carbon atoms, a polyether group having the formula $-(C_qH_{2q}O)_rR_9$ (q=2, 3 or 4; r=1 to 100; $R^9$=hydrogen or an alkyl group with 1 to 4 carbon atoms) or the group

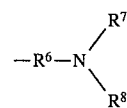

$R^6$ is a divalent, aliphatic hydrocarbon group with 2 to 6 carbon atoms or a divalent aromatic hydrocarbon group, $R^7$ and $R^8$ are alkyl groups of 1 to 4 carbon atoms, which can have an OH group or be a common constituent of a 5- or 6-membered ring, which may contain an oxygen or nitrogen atom, and Z has a numerical value of 0 or 1, as a material for at least partially opening the cells of rigid polyurethane foams otherwise containing closed cells, in amounts of about 0.2 to 5% by weight, based on the prepolymer having polyol or isocyanate groups.

Aside from their cell-opening properties, said products also have a stabilizing action, so that they can be used not generally but only in narrow concentration ranges.

Improving the dimensional stability of the foams formed, by means of appropriate cell-opening additions, has also been attempted in the case of so-called one-component polyurethane foams. In this connection, reference is made particularly to the German patent 31 22 790. This patent discloses a method for the preparation of such one-component polyurethane foams. To increase dimensional stability of the cured foam during its preparation, 0.015 to 0.1% by weight of a dimethylpolysiloxane, with a dynamic viscosity of 20 to 300,000 $mm^2$/sec or a polysiloxane, containing perfluorinated alkyl groups and having a dynamic viscosity of 100 to 10,000 $mm^2$/sec, based on the polyesters and/or polyethers and the auxiliaries, are added to the mixture.

In actual fact, the foams, produced in accordance with the German patent 31 22 790, have an improved dimensional stability. However, it has turned out that, in order to achieve the desired effect, it is necessary to adhere to very narrow limits for the addition of the polysiloxanes. If the addition of polysiloxanes is too low, the desired effect does not occur or occurs incompletely. However, if the required amounts are exceeded, the polysiloxanes affect foam formation in an undesirable manner, so that there are foam disorders and, in limiting cases, the resulting foam even collapses. The so-called processing tolerance is undesirably narrow. These observations also apply quite generally for rigid polyurethane foams, which are prepared not by the special method of one-component foaming but, as described above, by conventional means.

OBJECT OF THE INVENTION

An object of the invention is a method for the preparation of rigid foams, having urethane, isocyanurate or both groups, the foams being open celled.

The method improves the dimensional stability of rigid polyurethane foams generally and the dimensional stability of one-component polyurethane foams in particular by the addition of cell-opening modifiers, and to avoid the disadvantages observed when the known polysiloxanes are used. In particular, the processing tolerance of the formulation is expanded.

Another object of the invention is the extensively open-celled rigid foam obtained by the inventive method.

SUMMARY OF THE INVENTION

Pursuant to the invention, polyisocyanates are reacted with compounds having at least two groups, which are capable of reacting with isocyanates and have the equivalent weight per reactive group of about 9 to 800, in the presence of catalysts, surface active substances as well as optionally, physical blowing agents, flame retardants and other known auxiliary materials and finishing agents. The reaction is carried out in the presence of liquid, higher molecular weight, unsaturated hydrocarbons, which are free of groups capable of reacting with isocyanates in amounts of 0.01 to 3.0% by weight, based on the reaction formulation.

The compounds capable of reacting with isocyanate preferably have, on the average, three hydroxyl groups per molecule and furthermore the OH-number of such compounds lies between about 100 and 800.

The rigid hard foam materials produced by the present inventive method has a volumetric weight of from 20 to 60 $Kg/m^3$.

The concept of "extensively" in the present invention is to be understood to imply that at least such a number of cells of the rigid foam is opened, so that this rigid foam has dimensional stability. Dimensional stability is achieved when at least 30% of the cells are open.

Preferably, polybutadiene or polyoctenylene are used for the inventive method in amounts of 0.01 to 3% by weight, based on the reaction formulation, as liquid, higher molecular weight, unsaturated hydrocarbons.

Preferably, polybutadiene is used in amounts of 0.03 to 1.0% by weight and polyoctenylene in amounts of 0.02 to 0.5% by weight.

The polybutadiene and the polyoctenylene preferably have a number average molecular weight of about 800 to 10,000 g/mole and preferably a number average molecular weight range of about 1,000 to 6,000 g/mole and, particularly, of about 1,500 to 4,000 g/mole.

The foams, obtained by the inventive method, have excellent dimensional stability. The processing tolerance is wider than was previously possible. With the exception of the desired cell opening, the foaming of the reaction mixture and the formation of a foam are not affected or at least not affected disadvantageously. It is a further advantage that the foam obtained is hydrophobized to a certain extent. Such hydrophobization is entirely desirable from an applications point of view.

Admittedly, the addition of liquid polybutadiene to the reaction method during the preparation of molded polyurethane or of polyurea objects, optionally with a cellular core, particularly by the so-called RIM method, is known from the German patent 38 37 351. However, the polybutadiene acts there as an internal release agent and prevents the molded objects, such as fenders, spoilers, shoe soles, from being cemented together with the walls of the molds, in which they are produced. However, Polybutodiene's suitability as a cell opener in rigid polyurethane foam systems cannot be inferred from this.

Furthermore, it is known from the European publication 0 173 004 that vibration-inhibiting polyurethane foam with a density of 0.4 to 0.75 $kg/m^3$ can be produced by using liquid polybutadienes with terminal hydroxyl groups in the foaming formulation. In this case, however, the butadiene polyol, together with conventional polyols, is tied into the framework of the polyurethane foam by reacting with the isocyanate and does not develop the inventive cell-opening action of the present application. Rather, its task is to modify the foam properties in relation to improving the vibration-damping effect.

For the preparation of rigid polyurethane foams with the inventive addition of unreactive, higher molecular weight, unsaturated hydrocarbons of the given type, the conventional raw materials, particularly the conventional polyols and polyisocyanates, can be used.

Examples of suitable polyols are multi-functional alcohols or amines, as well as their propoxylated derivatives or also polyester polyols, which are obtained by the esterification of multi-functional alcohols with polycarboxylic acids.

Examples of suitable polyisocyanates are aromatic polyisocyanates, particularly the mixtures of isomeric toluylene diisocyanates or diphenylmethane diisocyanates in their industrially obtainable composition.

Examples of auxiliary materials are plasticizers, such as diphenylcresyl phosphate, dioctyl phthalate or dialkyl esters of sebacic acid. Further auxiliary materials are flame retardants, dyes, catalysts and the like.

Halogenated hydrocarbons, which are commercially obtainable under the name of Frigen® 22, 141b or 142b, are suitable as propellants with little effect on the ozone layer. Halogenated hydrocarbons, which are obtainable commercially under the name of Frigen®134a, 152a, as well as mixtures are suitable as propellants, which do not harm the ozone layer.

It is also possible to use low-boiling hydrocarbons, such as the isomers of pentane, or ethers as propellants.

The object of the present invention is explained in even greater detail by means of the following Examples, it being understood that the Examples are given by way of illustration and not by way of limitation. The increased open-celled nature of the foamed objects obtained corresponds to an improved dimensional stability (less than 70% closed cells implies dimensional stability).

The following raw materials are used for the Examples.

Polyol A:

Propylene oxide polyol, started with sucrose/glycerin and having an OH number of 520;

Polyol B:

Propylene oxide polyol, started with glycerin and having an OH number of 550;

System C:

Preformulated polyol (contains ester polyols) with an isocyanate equivalent of 1.40;

Isocyanate:

Polymeric diphenylmethane-4,4'-diisocyanate containing 31% isocyanate groups (crude MDI);

Stabilizer E:

Polysiloxane-polyether block copolymer (Tegostab® 8404 of Th. Goldschmidt AG);

Stabilizer F:

Polysiloxane-polyether block copolymer (Tegostab® 8450 of Th. Goldschmidt AG);

Compound G, which is to be used pursuant to the invention:

Liquid polybutadiene with a molecular weight of 3,000 g/mole;

Compound H, which is to be used pursuant to the invention:

Liquid polybutadiene with a molecular weight of 1,800 g/mole; and

Compound I, which is to be used pursuant to the invention:

Liquid polyoctenylene with a molecular weight of 1,600 g/mole.

EXAMPLES 1 TO 3

Free-rising test pieces, with the basic dimensions of 27.5 cm×14 cm, are produced by the customary laboratory foaming method. The following formulations were taken as a basis, the data in each case being related to 100 parts of polyol.

TABLE 1

|  | Comparison Example 1 | Example 1 | Example 2 | Example 3 |
| --- | --- | --- | --- | --- |
| Polyol A | 100.0 | 100.0 | 100.0 | 100.0 |
| Water | 1.0 | 1.0 | 1.0 | 1.0 |
| Triethylamine | 3.0 | 3.0 | 3.0 | 3.0 |
| Trichlorofluoromethane | 40.0 | 40.0 | 40.0 | 40.0 |
| Stabilizer E | 1.0 | 1.0 | 1.0 | 1.0 |
| Inventive Compound G | — | 0.25 | — | — |
| Inventive Compound H | — | — | 0.05 | — |
| Inventive Compound I | — | — | — | 0.10 |
| Isocyanate (Index 110) | 155.0 | 155.0 | 155.0 | 155.0 |
| Cells/cm | 38 | 40 | 39 | 40 |
| Closed cell nature (%) (DIN ISO 4590) | 92 | 62 | 3 | 1 |

Examples 1, 2 and 3 confirm the cell-opening effect of the inventive compounds in free-rising rigid polyurethane foams.

EXAMPLES 4 TO 7

The test pieces are produced in an L-shaped mold, open towards the top, by conventional laboratory methods for producing rigid foams. The test pieces are 27 cm+110 cm long, 14 cm wide and 3.5 cm thick and are tempered at 40°. The reaction mixture to be foamed is introduced into the lower part of the mold and expanded.

TABLE 2

|  | Comparison Example 2 | Example 4 | Example 5 | Example 6 | Example 7 | Comparison Example 3 |
| --- | --- | --- | --- | --- | --- | --- |
| Polyol B | 100.0 | 100.0 | 100.0 | 100.0 | 100.0 | 100.0 |
| Water | 4.0 | 4.0 | 4.0 | 4.0 | 4.0 | 4.0 |
| Dimethylcyclohexylamine | 1.5 | 1.5 | 1.5 | 1.5 | 1.5 | 1.5 |
| Stabilizer E | 1.0 | 1.0 | 1.0 | 1.0 | 1.0 | 1.0 |
| Inventive Compound G | — | 0.5 | — | — | — | — |
| Inventive Compound H | — | — | 0.5 | — | — | — |
| Inventive Compound I | — | — | — | 0.5 | 0.15 | — |
| Isocyanate (Index 110) | 212.0 | 212.0 | 212.0 | 212.0 | 212.0 | 212.0 |
| Cells/cm | 46 | 44 | 44 | 14 | 42 | 43 |
| Closed cell nature (%) (DIN ISO 4590) | 95 | 19 | 28 | 1 | 1 | 92 |

*Comparison Example 3 is freely foamed as are Examples 1 to 3

Examples 4 to 7 document that the cell-opening action of the inventive compounds is also in formulations blown only by water. Moreover, the inventive effect is also shown when the blowing is carried out in molds. The use of the inventive compounds at concentrations significantly above those required to achieve cell opening leads to a coarsening of the cells (Examples 6 and 7).

EXAMPLES 8 TO 11

The foamings of Examples 8 and 9 and of Comparison Example 4 are carried out in a mold, which is open towards the top, as described in Examples 1 to 3.

In Examples 10 and 11 and in the Comparison Example 5, the same formulation is used to prepare rigid foams in a mold with the dimensions of 50 cm×50 cm×5 cm. The mixture to be foamed is added to a horizontally disposed mold and the mold is subsequently arranged vertically.

TABLE 3

|  | Comparison Example 4 | Example 8 | Example 9 | Comparison Example 5 | Example 10 | Example 11 |
| --- | --- | --- | --- | --- | --- | --- |
| Polyol C | 100.0 | 100.0 | 100.0 | 100.0 | 100.0 | 100.0 |
| Water | 0.9 | 0.9 | 0.9 | 0.9 | 0.9 | 0.9 |
| HCFC 141b | 32.0 | 32.0 | 32.0 | 32.0 | 32.0 | 32.0 |
| Trichloropropyl-phosphite | 4.0 | 4.0 | 4.0 | 4.0 | 4.0 | 4.0 |
| Dimethylcyclohexylamine | 2.0 | 2.0 | 2.0 | 2.0 | 2.0 | 2.0 |
| Stabilizer E | 0.3 | 0.3 | 1.5 | 0.3 | 0.3 | 0.5 |
| Stabilizer F | 1.2 | 1.2 | — | 1.2 | 1.2 | 1.0 |
| Inventive Compound H | — | 0.1 | — | — | — | — |
| Inventive Compound I | — | — | 0.1 | — | — | — |
| Isocyanate (Index 115) | 156.0 | 156.0 | 156.0 | 156.0 | 156.0 | 156.0 |
| Cells/cm | 35 | 38 | 40 | 40 | 12 | 40 |
| Closed cell nature (%) (DIN ISO 4590) | 95 | 2 | 0 | 96 | 2 | 1 |

Examples 8 to 11 clearly show the cell-opening action of the inventive compounds in formulations, which are blown with HCFC 141b. The effectiveness of the mold foaming is shown once again. In Examples 10 and 11, the dependence of the effect on the stabilizer used becomes clear.

We claim:

1. A method for the preparation of extensively open celled rigid foams comprising:

reacting a polyisocyanate with compounds having on average three hydroxyl groups per molecule and further having an OH-number between about 100 to 800 in presence of a catalyst, surface active substance, as well as, optionally, one or more members of a group consisting of a physical blowing agent, flame retardant, other auxiliary materials and finishing agents; and carrying the reaction in the presence of polybutadiene or polyoctenylene or both as an unsaturated hydrocarbon having a number average molecular weight of between about 800 to 10,000 g/mol., wherein the hydrocarbon is present in an amount between about 0.01 and 3.0% by weight based on the reaction formulation, so as to produce an extensively open celled rigid foam with a density of between about 20 and 60 Kg/m$^3$.

2. The method of claim 1, comprising carrying the reaction in the presence of polybutadiene or polyoctenylene having a number average molecular weight of 1,000 to 6,000 g/mole.

3. The method of claim 1, comprising carrying the reaction in the presence of polybutadiene or polyoctenylene having a number average molecular weight of 1,500 to 4,000 g/mole.

4. The method of claim 1, comprising carrying the reaction in the presence of polybutadiene in an amount of 0.03 to 1.0% by weight.

5. The method of claim 1, comprising carrying the reaction in the presence of polyoctenylene in an amount of 0.03 to 1.0% by weight.

6. The method of claim 1, comprising carrying the reaction in the presence of polyoctenylene in an amount of 0.02 to 5.0% by weight.

7. An extensively open celled rigid foam obtained by the method of claim 1.

* * * * *